United States Patent
Ouchi

[15] 3,703,169
[45] Nov. 21, 1972

[54] ENDOSCOPE

[72] Inventor: Teruo Ouchi, Tokyo, Japan

[73] Assignee: Olympus Optical Co., Ltd., Tokyo, Japan

[22] Filed: Dec. 21, 1970

[21] Appl. No.: 99,769

[30] Foreign Application Priority Data

Dec. 27, 1969    Japan ....................44/123642

[52] U.S. Cl. ...................................................128/6
[51] Int. Cl. ...........................A61b 1/06, A61b 1/12
[58] Field of Search............................128/6, 7, 8, 9

[56] References Cited

UNITED STATES PATENTS

| | | |
|---|---|---|
| 1,680,490 | 8/1928 | Wappler .......................128/7 |
| 1,767,025 | 6/1930 | Wappler .......................128/7 |
| 2,507,771 | 5/1950 | Cole .............................128/9 |
| 2,975,785 | 3/1961 | Sheldon ........................128/6 |
| 3,561,432 | 2/1971 | Yamaki ........................128/6 |

Primary Examiner—Channing L. Pace
Attorney—Kelman and Berman

[57] ABSTRACT

Endoscope for use with an instrument such as a forceps, a stripper brush, and a washing tube inserted through a guide channel provided in the endoscope. To facilitate and insure the exact operation of the inserted instrument, the optical axis of the observation optical system of the endoscope is so positioned that the optical axis is directed to the point at which the tip of the instrument is positioned during the operation of the instrument.

5 Claims, 5 Drawing Figures

PATENTED NOV 21 1972　3,703,169
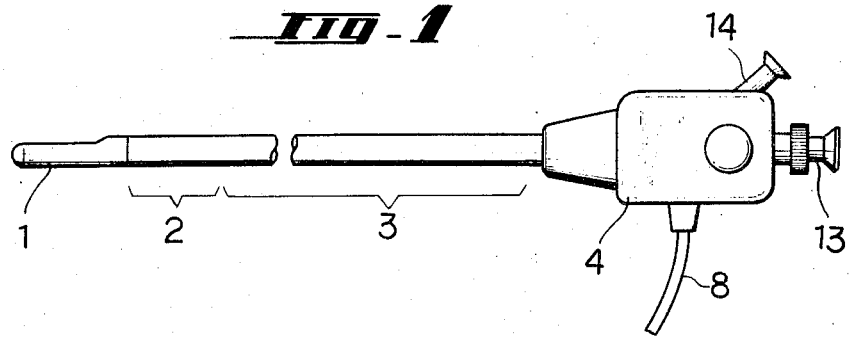
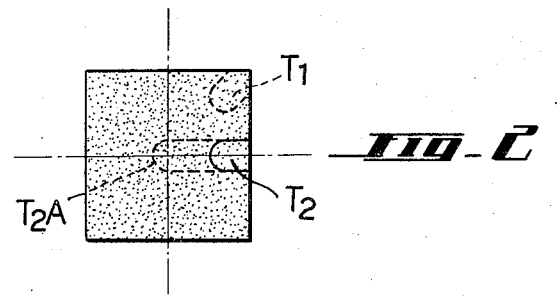
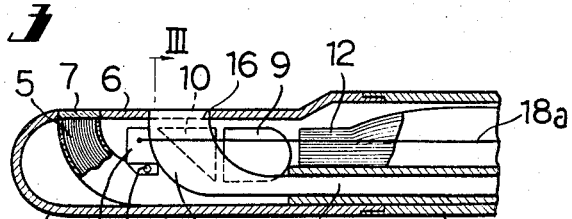
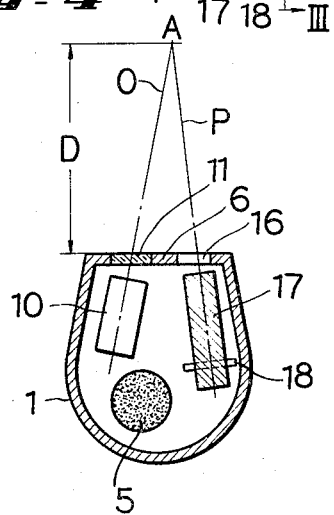
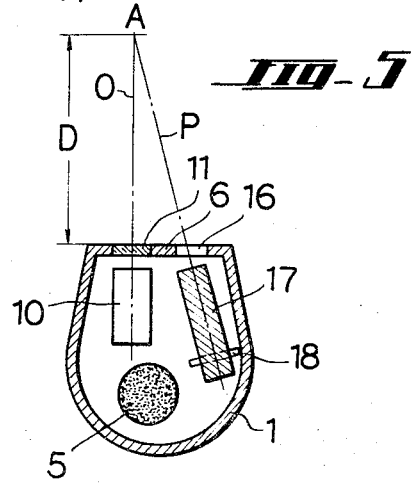
INVENTOR.
Teruo Ouchi
BY Kelman and Berman
Agents

ENDOSCOPE

BACKGROUND OF THE INVENTION

The present invention relates to an endoscope and, more particularly, to an endoscope used with an instrument such as a forceps, a stripper brush or a washing tube inserted through the endoscope which is operated while the object is observed by the endoscope.

In a prior art endoscope for use with an instrument which is inserted through a guide channel provided in the endoscope, the forward end portion of the endoscope is first inserted into the hollow portion of a living body to be inspected and then the instrument is inserted through the guide channel thereby permitting the various operations such as collection of the tissue from the object, application of medical fluid to the object and washing of the object to be carried out while the object is observed by the endoscope.

In the prior art endoscope of the type described above, however, the tip of the instrument projecting from the forward end portion of the endoscope cannot always be located within the field of view of the endoscope, and it is difficult to operate the endoscope and the instrument so as to locate the tip of the instrument within the field of view, thereby requiring a high skill for properly operating the endoscope and the inserted instrument.

The present invention aims at avoiding the disadvantages of the prior art endoscope as described above.

Preferred embodiments of the present invention will be described below with reference to the accompanying drawings illustrating the same.

BRIEF DESCRIPTION OF THE DRAWING

FIG. 1 is a general view of an embodiment of the endoscope of the present invention;

FIG. 2 is a view showing the field of view of an endoscope for use with an inserted instrument;

FIG. 3 is a fragmentary sectional view showing the forward end portion of the endoscope of FIG. 1;

FIG. 4 is a cross-sectional view taken along line III—III in FIG. 3; and

FIG. 5 is a cross-sectional view similar to FIG. 4 but showing a modification of FIG. 4.

DETAILED DESCRIPTION OF THE PREFERRED EMBODIMENTS

Referring to FIG. 1, the endoscope of the present invention comprises a forward end portion 1, a controllably bendable tubular portion 2 with its forward end connected to the forward end portion 1, an elongated yieldably flexible tube 3 with its forward end connected to the rear end of the controllably bendable tubular portion 2, and a control housing 4 connected to the rear end of the flexible tube 3.

String means (not shown) extends through the controllably bendable tubular portion 2 and the flexible tube 3 with its forward end fixedly secured to the forward end of the controllably bendable tubular portion 2 and the rear end of the string means is connected to a manually operable control mechanism (not shown) arranged in the control housing 4 so that the controllably bendable tubular portion 2 is controllably bent by the operation of the control mechanism in the conventional manner.

An illuminating fiber optical system 5 (FIG. 3) extends from the forward end portion 1 through the tubular portion 2 and the flexible tube 3 to the control housing 4 with its forward end terminating at an illuminating window 7 provided in the flattened wall portion 6 of the forward end portion 1, the rear end of the illuminating fiber optical system 5 extending beyond the control housing 4 through a sheath 8 and being connected to a light source (not shown) so that the light from the light source is transmitted through the illuminating fiber optical system 5 to window 7 to illuminate the object.

An objective 9 (FIG. 3) is located in the forward end portion 1 and a prism 10 is located in front of the objective 9 so as to direct the light coming from the object through an observation window 11 provided in the wall 6 toward the objective 9 so that an image of the object is formed by the objective 9.

An image transmitting fiber optical system 12 extends through the tubular portion 2 and the flexible tube 3, and the forward end thereof is located at a position at which the image of the object is formed by the objective 9 while the rear end terminates in the control housing 4.

An eyepiece 13 provided in the control housing 4 is located behind the rear end of the image transmitting fiber optical system 12 so that the image received and transmitted by the image transmitting fiber optical system 12 is viewed through the eyepiece.

A guide channel 14 for receiving an inserted instrument extends through the tubular portion 2, the flexible tube 3 and the control housing 4 with the forward end connected to an elbow 15 in the forward end portion 1 and ending at an opening 16 formed in the wall 6. The rear end of the guide channel 14 may extend from the control housing 4 as shown in FIG. 1 so as to facilitate the insertion of an instrument.

A deflector 17 is pivotally mounted in the forward end portion 1 adjacent to the elbow 15 on a pivot shaft 18 as shown in FIG. 3 so as to guide the tip of the inserted instrument.

A string 18a extends through the tubular portion 2 and the flexible tube 3 with the forward end secured to the deflector 17. The rear end of the string 18a is connected to a manually operable control means (not shown) provided in the control housing 4 so that the deflector 17 is actuated by the control means through the string 18a. Thus, when an instrument such as a forceps, a stripper brush or a washing tube is inserted through the guide channel 14 and the elbow 15 and the forward end thereof projects from the forward end portion 1 through the opening 16, the direction of the forward end is adjusted by the deflector 17 actuated by the control means.

In accordance with the present invention, the observation window 11 for receiving the light from the object and the opening 16 for the instrument are arranged side by side in the wall 6 of the forward end portion 1, and the optical axis O of the prism 10 extending laterally from the forward end portion is so positioned that the optical axis O intersects the plane P in which the deflector 17 pivots at the point A spaced a distance D from the window 11 at which the tip of the inserting instrument engages the viewed object for the operation thereof as shown in FIG. 4. The optical axis O and the plane P are symmetrically positioned with respect to a line perpendicular to the window 11 in the plane of FIG. 4.

The distance D is varied depending upon the purpose for which the endoscope is used.

FIG. 5 shows a modification of the device of FIG. 4 in which the optical axis O is perpendicular to the window 11 while the plane P is obliquely inclined with respect to the window 11.

It is apparent that the optical axis O may be oblique to the window 11 while the plane P is perpendicular to the window 11.

FIG. 2 shows the field of view of the endoscope. The tip T2A of the inserted instrument used in the endoscope of the present invention is located exactly at the center of the field of view when the forward end portion reaches the operative position so that the operation of the inserting instrument is greatly facilitated.

To the contrary, the tip $T_1$ or the tip $T_2$ of an instrument used in the prior art endoscope is located adjacent to the periphery of the field of view and the inspection of the operation of the tip of the inserting instrument is difficult thereby making the operation difficult.

In the above description, the endoscope is shown as being a side viewing endoscope. It is apparent, however, that the present invention may be incorporated in a front viewing endoscope.

Also, it is apparent that a photographic device such as a single lens reflex camera may be incorporated in the endoscope of the present invention.

I claim:

1. In an endoscope including an elongated flexible tube, a control housing at one longitudinal end of said tube, a forward end portion extending from the other longitudinal end of said tube in the direction of elongation of said tube, an optical observation system including an objective and an observation window in said forward end portion, an eyepiece on said control housing, image transmitting means in said tube for transmitting an image from said objective to said eyepiece, an illuminating system for projecting light from said forward end portion toward an object to be viewed, said tube enclosing a guide channel terminating at an opening in said end portion, said guide channel being dimensioned for receiving an elongated instrument in a position in which the tip of said instrument projects from said opening while the rear end of said instrument is accessible near said one longitudinal end, deflector means engageable in said forward end portion with said instrument, operating means accessible near said one longitudinal end for pivoting said deflector means in a single plane about a pivot axis, and for thereby moving said projecting tip, said optical system having an optical axis extending outward of said forward end portion through said window, the improvement which comprises: said window and said opening being juxtaposed, and said plane of pivoting of said deflector means about said pivot axis obliquely intersecting a portion of said optical axis spaced from said window outward of said forward end portion.

2. In an endoscope as set forth in claim 1, said opening and said window being juxtaposed transversely of said direction.

3. In an endoscope as set forth in claim 2, said opening and said window being offset from each other substantially in the direction of said pivot axis.

4. In an endoscope as set forth in claim 3, said optical axis being transverse to said direction of elongation.

5. In an endoscope as set forth in claim 3, said illuminating system including means for objecting said light toward the point of intersection of said plane and of said optical axis.

* * * * *